United States Patent [19]
Wheeler et al.

[11] Patent Number: 5,672,274
[45] Date of Patent: Sep. 30, 1997

[54] ELECTRIC KETTLE WITH REMOVABLE FILTER

[75] Inventors: David K. Wheeler, Gananoque, Canada; Wong Hon Yuen, Hong Kong, Hong Kong; John McGaw, Markham, Canada

[73] Assignee: Black & Decker Inc., Newark, Del.

[21] Appl. No.: 692,034

[22] Filed: Aug. 2, 1996

[51] Int. Cl.⁶ .................. B01D 27/08; B01D 35/02
[52] U.S. Cl. .................. 210/474; 210/477; 210/481; 99/295; 99/323
[58] Field of Search .................. 99/295, 323; 210/474, 210/477, 481

[56] References Cited

U.S. PATENT DOCUMENTS

D. 350,257  9/1994  Breur et al. .................. D7/400

FOREIGN PATENT DOCUMENTS

| | | |
|---|---|---|
| 66874 | 9/1990 | Canada. |
| 71038 | 7/1992 | Canada. |
| 72871 | 7/1993 | Canada. |
| 2701372 | 8/1994 | France. |
| 2195234 | 4/1988 | United Kingdom. |
| 2223160 | 4/1990 | United Kingdom. |
| 2251547 | 7/1992 | United Kingdom. |
| 2258141 | 2/1993 | United Kingdom. |
| 2261362 | 5/1993 | United Kingdom. |
| 2268680 | 1/1994 | United Kingdom. |
| 2274791 | 8/1994 | United Kingdom. |
| 2274792 | 8/1994 | United Kingdom. |
| 2279233 | 1/1995 | United Kingdom. |
| 2282523 | 4/1995 | United Kingdom. |
| 2284563 | 6/1995 | United Kingdom. |
| WO 95/13733 | 5/1995 | WIPO. |

*Primary Examiner*—W. L. Walker
*Attorney, Agent, or Firm*—Barry E. Deutsch

[57] ABSTRACT

An electric kettle having a housing, a heating element, and a filter system. The filter system has a connecting frame and a filter member. The connecting frame is stationarily connected to the housing and forms a vent conduit with the housing. The filter member is removably received in the connecting frame and has a top located at an exterior of the housing. A user can remove the filter member by moving the top of the filter member without having to move other components of the kettle.

13 Claims, 4 Drawing Sheets

ELECTRIC KETTLE WITH REMOVABLE FILTER

BACKGROUND OF THE INVENTION

1. Field of the Invention

The present invention relates to electric kettles and, more particularly, to a kettle with a removable filter.

2. Prior Art

Canadian Industrial Design No. 71038 discloses a kettle. U.K. patent application No. GB 2261362 discloses a water heating vessel with a removable filter. Canadian Industrial Design No. 72871 discloses a filter for an electric water kettle. Canadian Industrial Design No. 66874 discloses a tea kettle.

SUMMARY OF THE INVENTION

In accordance with one embodiment of the present invention, an electric kettle is provided having a housing with a pour spout, an electric heating element, and a filter removably connected to the housing at the pour spout. The filter has a frame with a top located at a top of the pour spout. The top of the frame is accessible by a user to remove the filter from the housing without the user having to move any other components of the kettle.

In accordance with another embodiment of the present invention, an electric kettle is provided comprising a housing, an electric heating element, and a filter system. The heating element is located in the housing. The filter system is connected to the housing and has a connecting frame and a filter member removably connected to the connecting frame. The connecting frame is stationarily connected to the housing, has an aperture for water to pass through the frame for exiting the housing, and has a receiving area. The filter member is removably located in the receiving area.

In accordance with another embodiment of the present invention, a filter member for an electric kettle is provided. The filter member has a frame and a filter element connected to the frame. The frame is sized and shaped to be slidingly inserted into the kettle along a longitudinal axis of a main section of the filter element. The frame has a top ledge extending perpendicular to the longitudinal axis for a user to push the filter member into position in the kettle and for pulling the filter member out of the electric kettle.

BRIEF DESCRIPTION OF THE DRAWINGS

The foregoing aspects and other features of the invention are explained in the following description, taken in connection with the accompanying drawings, wherein:

FIG. 4A is a perspective view of a connecting frame used in the kettle shown in FIG. 3;

FIG. 4B is a perspective view of the connecting frame shown in FIG. 4A from an opposite direction.

DETAILED DESCRIPTION OF THE PREFERRED EMBODIMENTS

Figure 1:
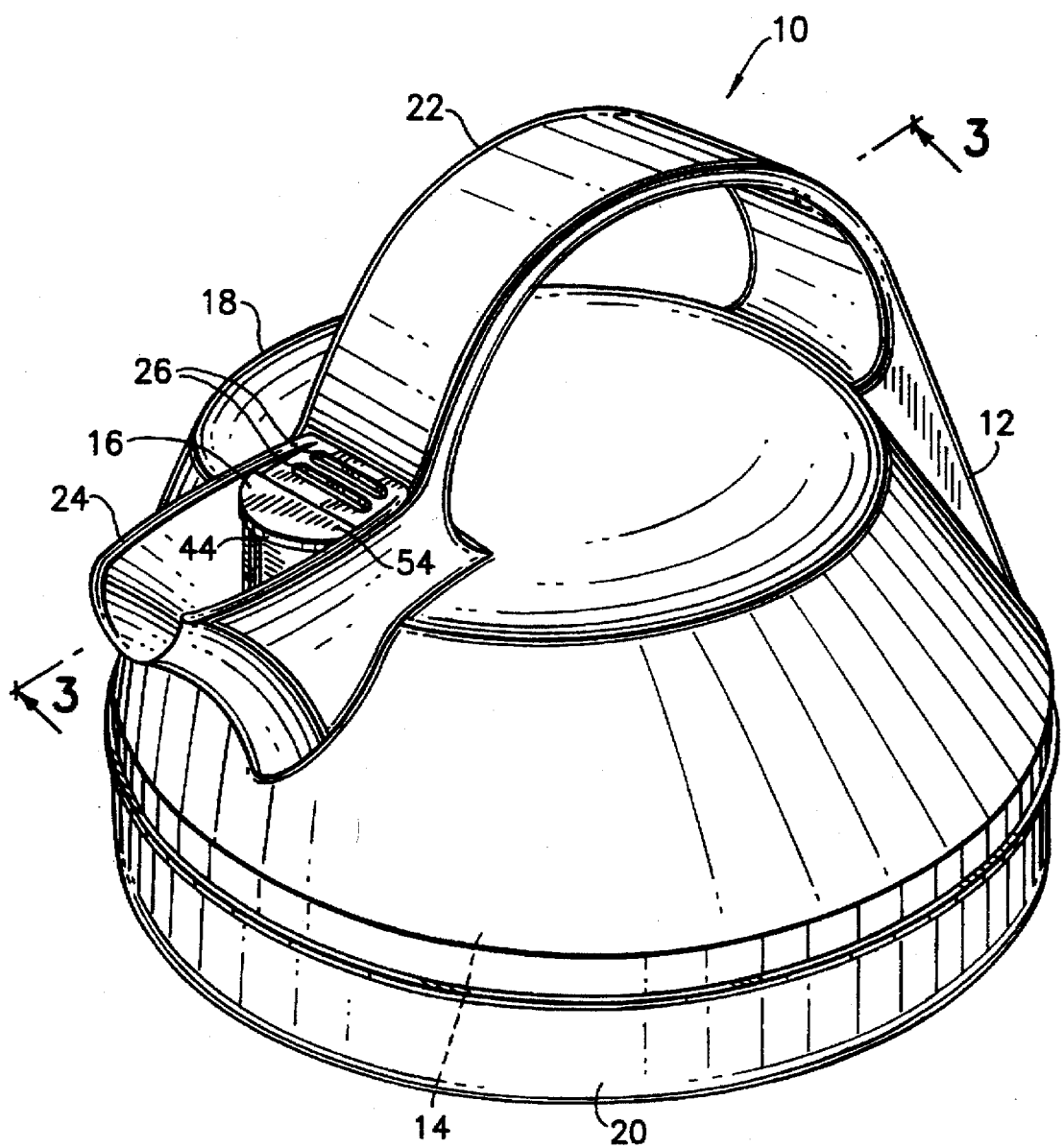
FIG. 1 is a perspective view of an electric kettle incorporating features of the present invention.

Referring to FIG. 1, there is shown a perspective view of an electric kettle 10 incorporating features of the present invention. Although the present invention will be described with reference to the embodiments shown in the drawings, it should be understood that features of the present invention could be embodied in various different forms of alternate embodiments. In addition, any suitable size, shape or type of materials or elements could be used.

Figure 3:
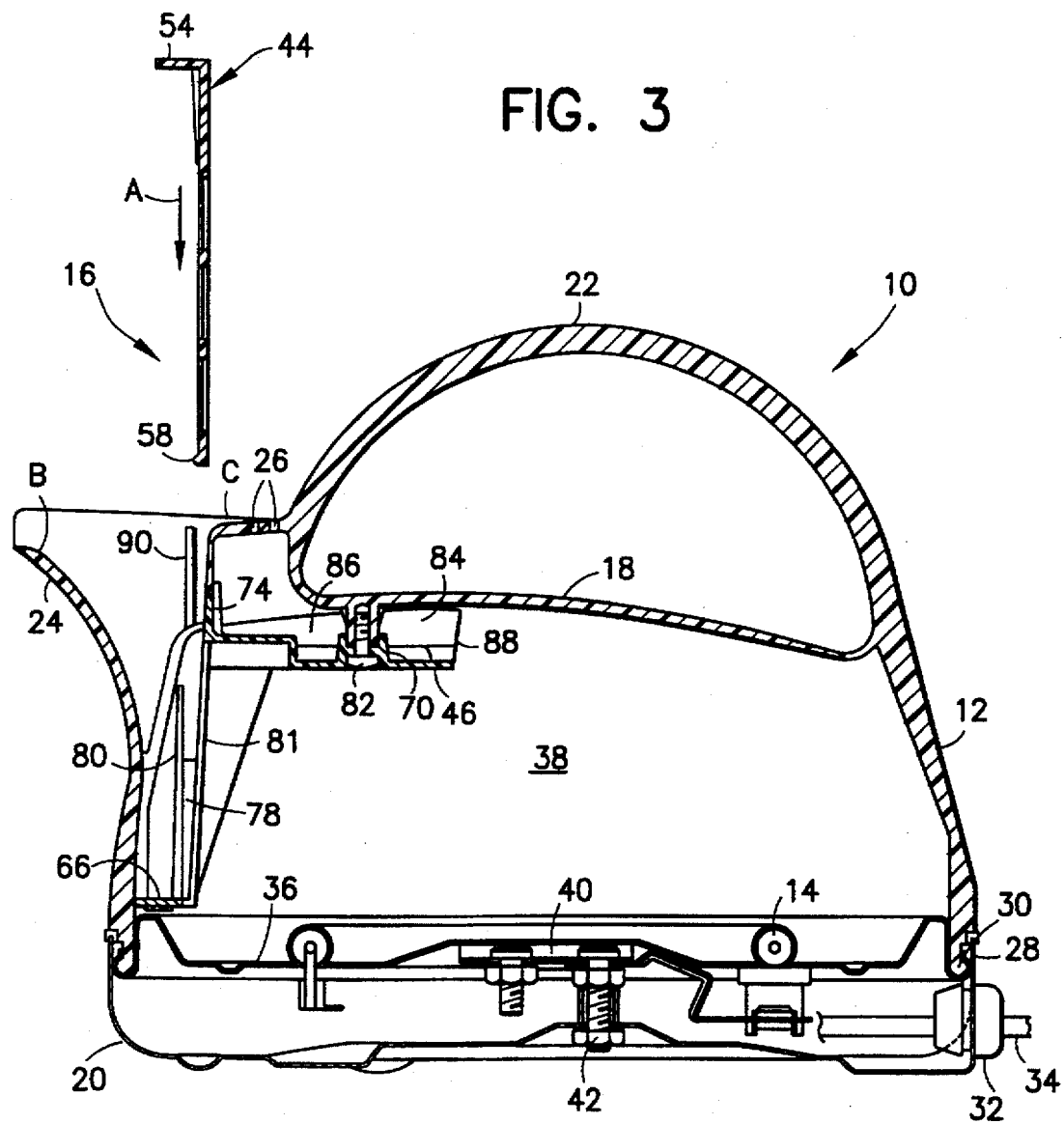
FIG. 3 is a cross sectional view of the kettle shown in FIG. 1 taken line 3—3 with the filter element in an exploded position.

Referring also to FIG. 3, the kettle generally comprises a housing 12, a heating element 14 and a filter system 16. The housing 12 generally comprises a top 18 and a bottom 20. The top 18 is a one-piece molded plastic member with a handle 22, a pour spout 24 and vent apertures 26. In alternate embodiments other types of tops could be provided. The bottom 20 merely comprises a one-piece metal member with a lip 28 that fits over the bottom rim 30 of the top 18. The bottom 20 has a hole with a grommet 32 therein for entry of an electrical cord 34. In alternate embodiments other types of bottoms could be provided.

The heating element 14 is electrically connected to the electrical cord 34 and is mechanically attached to the top 18 of the housing 12 by a plate 36. The plate 36 is preferably made of metal, such as aluminum. The outer edge of the plate 36 is attached to the bottom rim 30 of the top 18. The top 18 and plate 36 make a sealing engagement with each other to form a water holding area 38. Attached to the bottom center of the plate 36 is a bracket 40 and a fastener 42. The bracket 40 is attached to the plate 36, such as by spot welding. The fastener 42 is used to fixedly attach the bottom 20 to the plate 36. Since the plate 36 is fixedly attached to the top 18 at the rim 30, this fixedly attaches the bottom 20 to the top 18.

Figure 2:
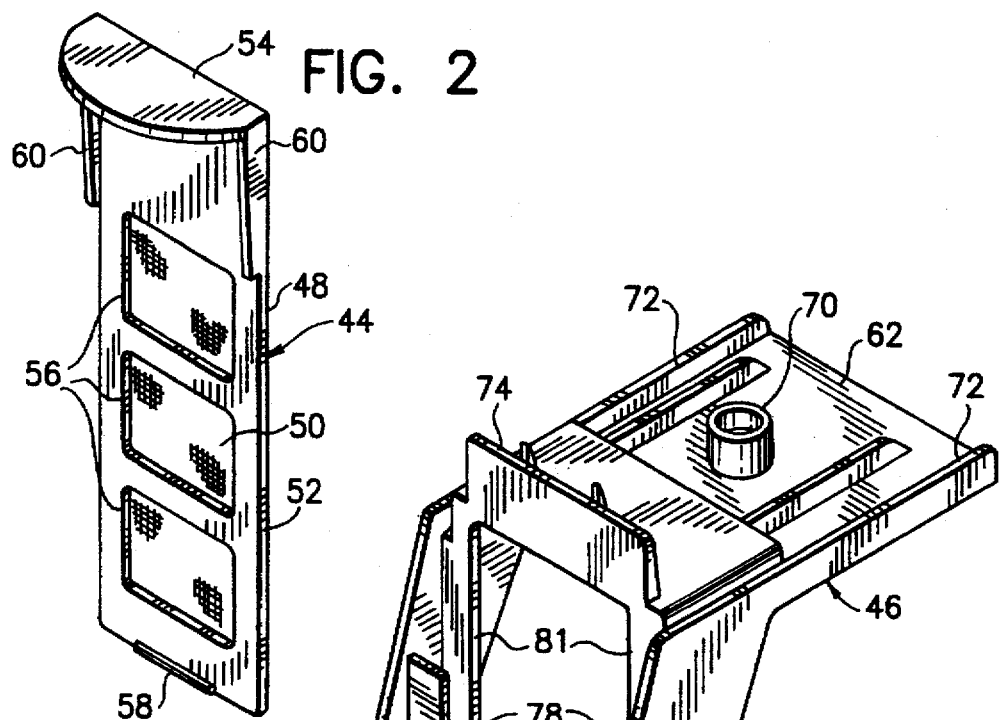
FIG. 2 is a perspective view of a filter member used in the kettle shown in FIG. 1.

The filter system 16 generally comprises a filter member 44 and a connecting frame 46. Referring also to FIG. 2, the filter member 44 includes a frame 48 and a filter element 50. The frame 48 has a main section 52 and a top section 54. The main section has a general straight flat shape with three windows 56. The bottom of the frame 48 has a protrusion 58. The top of the main section 52 has stiffening ribs 60. The top section 54 is flat and extends generally perpendicular to the longitudinal axis of the main section 52. The frame 48 is preferably made of plastic that is molded onto the filter element 50. The filter element 50 merely comprises a polymer mesh screen. In alternate embodiments, other shapes and sizes of filter members could be used.

Referring also to FIGS. 4A and 4B, the connecting frame 46 is shown. The connecting frame 46 includes a top section 62, two side sections 64, a bottom section 66, and a main aperture 68. The top section 62 has a boss 70 with a screw hole therein, side ribs 72, and a front section 74. The bottom section 66 has side tabs 76. The side sections 64 are mirror images of each other. Each side section 64 has a slot 78 formed by walls 80, 81. Outer end walls in the slots 78 taper inward from top to bottom. As seen in FIG. 3, a single screw 82 is used to fixedly attached the connecting frame 46 to the top 18. The side ribs 72 of the top section 62 receive ribs 84 of the top 18 adjacent their inboard sides. This forms a closed vent conduit 86 between the apertures 26 and an opening 88 at the end of the conduit 86. The fronts of the side walls 64 are located against the interior side wall of the top 18. The top 18 has support ribs (not shown) to support the outer edges of the fronts of the side walls 64. The tabs 76 are received in notches (not shown) at the bottom of these support ribs (not shown). As seen in FIG. 1, with the filter member 44 in position, the top section 54 of the frame 48 is located at the exterior surface of the housing 12. The filter member 44 is inserted into the kettle 10 as indicated by arrow A in FIG. 3. The housing top 18 has guide ribs 90 at the top rear section of the pour spout 24. These guide ribs 90 also function as a downward stop when the top section 54 of the filter member 44 contacts them. The sides of the filter member are received in the slots 78 of the connecting frame 46. The bottom protrusion 58 on the filter member 44 forms a snap-lock connection with the rear of the bottom section 66 of the connecting frame 46.

When water is poured out of the kettle 10, it travels through the main aperture 68 of the connecting frame 46, through the filter element 50 in the windows 56 of the filter member 44, and out the pour spout 24. As the water is poured, air can enter the water holding area 38 through the conduit 86. In order to remove the filter member 44 from the kettle 10, such as for filling the kettle with water or for cleaning out the area 38, a user merely moves the filter member 44 in a direction reverse to direction A. Because the top section 54 of the filter frame 48 is located at the top rear of the pour spout 24 at the exterior of the housing 12, a user can merely grasp the top section 54 and pull upward. A sufficient force must be exerted to cause the protrusion 58 on the bottom of the filter member 44 to snap past the ledge of the bottom section 66 of the connecting frame 46. The user can use area B of the pour spout 24 as leverage with his or her thumb. The user can also use area C at the apertures 26 to push against the housing 12 with one finger while pulling up with a finger of the same hand on the underside of the top 54. With the embodiment described above, the filter member 44 can be removed from the kettle 10 without the user having to move any other components of the kettle. Unlike prior art kettles that have covers over their filters that have to be moved in order to remove the filters, the present invention is a simpler design that is less expensive to manufacture and assemble.

Figure 5:
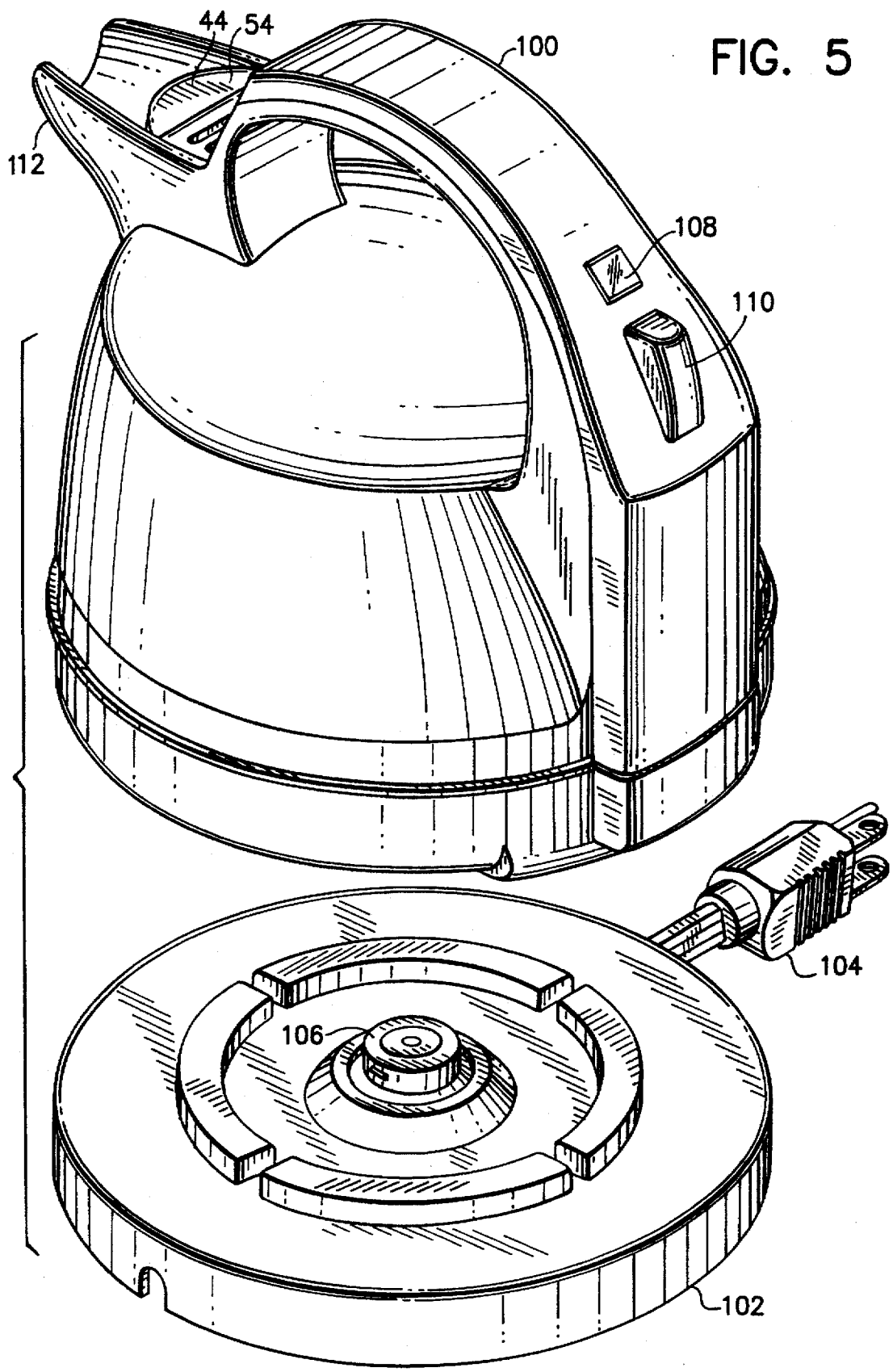
FIG. 5 is a partially exploded perspective view of an alternate embodiment of the present invention.

Referring now to FIG. 5, an alternate embodiment of the present invention is shown. In this embodiment, the kettle 100 is a cordless kettle with a base 102. The base 102 has an electrical cord and plug 104 and an electrical connector 106. The kettle 100 has an electrical connector (not shown) on its bottom to contact the connector 106. The kettle 100 also has a power light 108 and an ON/OFF switch 110. Similar to the kettle 10, the kettle 100 has the filter member 44 with its top 54 at the top rear of the pour spout 112. In alternate embodiments, any suitable type of control of the heating element could be provided as well as any suitable type of electrical cord or cordless electrical arrangement.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. In an electric kettle having a housing with a pour spout, an electric heating element, and a filter removably connected to the housing at the pour spout, wherein the improvement comprises:

the filter having a frame with a top located at a top of the pour spout, the top of the frame being accessible by a user to remove the filter from the housing without the user having to move any other components of the kettle;

a connecting frame connected to the housing at the pour spout, the connecting frame having a receiving area with the filter removably located therein;

said connecting frame having a top section forming a conduit with the housing to a vent aperture in the housing; and said connecting frame is a one-piece member connected to the housing by a single fastener.

2. A kettle as in claim 1 wherein the frame of the filter has a main section that is generally straight and flat.

3. A kettle as in claim 1 wherein the filter has a filter element connected to the frame.

4. A kettle as in claim 1 wherein a bottom of the filter frame has a projection thereon to function as a snap-lock ledge to prevent inadvertent removal of the filter from the housing.

5. A kettle as in claim 4 wherein a top section of the filter frame has stiffening ribs.

6. A kettle as in claim 1 wherein the top of the frame is generally flat and perpendicular to a main section of the frame.

7. An electric kettle comprising:

a housing;

an electric heating element located in the housing; and a filter system connected to the housing, the filter system having a connecting frame and a filter member removably connected to the connecting frame, the connecting frame being stationarily connected to the housing, having an aperture for water to pass through the frame for exiting the housing, and having a receiving area, the filter member being removably located in the receiving area.

8. A kettle as in claim 7 wherein the connecting frame is a one-piece member.

9. A kettle as in claim 7 wherein the connecting frame is connected to the housing by a single fastener.

10. A kettle as in claim 7 wherein the connecting frame has a top section that forms a conduit with the housing to a vent aperture through the housing.

11. A kettle as in claim 7 wherein the filter member has a protrusion at its bottom and the connecting frame has a ledge at its bottom to form a snap-lock mounting of the filter member to the connecting frame.

12. A kettle as in claim 7 wherein the connecting frame has side channels that the filter member is received in.

13. A kettle as in claim 7 wherein the filter member has a top section that is located at the exterior of the housing such that a user can move the top section to remove the filter member without moving any other components of the kettle.

* * * * *